United States Patent Office 3,629,235
Patented Dec. 21, 1971

3,629,235
PROCESS FOR ISOLATING AN INTERFERON INDUCER AND THE PRODUCT PER SE
George P. Lampson, Hatfield, Arthur K. Field, North Wales, and Alfred A. Tytell, Lansdale, Pa., assignors to Merck & Co., Inc., Rahway, N.J.
No Drawing. Continuation-in-part of application Ser. No. 632,240, Apr. 20, 1967. This application Feb. 12, 1969, Ser. No. 798,800
Int. Cl. C12d 13/06
U.S. Cl. 260—211.5
9 Claims

ABSTRACT OF THE DISCLOSURE

Process for isolating a nucleic acid from the mycelium of *Penicillium funiculosum* which has grown in a synthetic culture media. The nucleic acid per se is claimed. This nucleic acid acts as an inducer to stimulate the production of interferon when administered to living animals, including humans, or when added to living animal cells growing in a nutrient media.

RELATED CASES

This is a continuation-in-part of Ser. No. 632,240 now abandoned. Also related to 604,137 now abandoned and its continuation-in-part. Case No. 12530, filed Jan. 17, 1969; 641,119 now abandoned; 659,308 now abandoned; and omnibus 684,936.

This invention is concerned with the induction of interferon production and the induction of resistance to viral infection by administration of a nucleic acid isolated from the mycelium of *Penicillium funiculosum*, a fungus, which has been grown in a man-made environment.

Interferon was discovered as a substance which was elaborated in vivo by live virus-infected animal cells and as a substance which interfered with virus replication. Since its discovery, it has been found that animal cells growing in a culture medium can be induced to produce recoverable amounts of interferon. Also, it has been discovered that agents other than live virus serve as interferon inducers; among these agents are endotoxins, killed virus, polysaccharides such as statolon, tric agents, PPLO and brucella, as reported in the literature.

A feature of interferon is that although its production has been induced by one agent, it is active against a broad spectrum of viruses. This has made it of especial value as an antiviral agent despite the fact that interferon has been found to be species specific in that interferon produced by one animal species or its cells is ineffective if isolated and injected into another animal species. Despite this species restriction, interferon is useful in animals and man as its augmented production under the influence of inducers increases the ability of the host to overcome a virus infection.

The present invention involves the discovery that a certain nucleic acid can be isolated from a known fungus grown under artificial conditions and can be used as an inducer to cause the production of exceptionally large amounts of interferon. This particular nucleic acid is one of the many which occurs in the mycelium of *P. funiculosum* under these synthetic growth conditions and its isolation and recovery in purified form is a feature of this invention. It is believed that this nucleic acid has not been known or identified prior to the present invention and in fact, it is entirely possible that the methods for its isolation and recovery result in its chemical conversion from the inactive form in which it is produced by the fungus during its controlled growth.

The nucleic acid of this invention can be used as an inducer for interferon production, either in vivo or in vitro. The principal use is its injection into an animal or a person so that interferon is produced in vivo in large quantities whereby it serves to protect the host against infection by a variety of viruses. It is also useful, although to a lesser degree, for addition to a culture medium containing living animal or human cells as it serves to induce the formation of interferon in large quantities so that the interferon can be recovered for injection into that animal species or man to increase resistance to a virus infection.

The mold *P. funiculosum* is known as its characteristics are described in commonly available text books. It is available from various type culture collections such as those maintained in the A.T.T.C. and Regional Laboratories. It appears that all species conforming to the general description for this species will be producers of the nucleic acid which is the feature of this invention.

In general, this fungus is grown in a conventional nutrient culture medium known to support the growth of molds, the mycelium is collected and subjected to isolation steps to recover the nucleic acid of this invention, and this nucleic acid is employed as the inducer to cause and augmented production in host cells of interferon.

The nucleic acid of this invention was produced, isolated and purified as set forth in the following representative examples:

(a) A conventional culture medium known to be suitable to support the growth of molds of fungus may be used for growing the *P. funiculosum*. A representative one, consisting of glucose, yeast autolysate, $NaNO_3$, $K_2HPO_4$, $MgSO_4 \cdot 7H_2O$, KCl, Rochelle salts, $FeSO_4$, and $ZnSO_4 \cdot H_2O$ was inoculated with spores from *P. funiculosum* starter culture. Both this medium as well as that of the starter culture contained 66.6 gm. dextrose/1, 3.3 gm. $NaNO_3/1$, 16.2 gm. yeast autolysate/1, 1.1 gm. $K_2HPO_4/1$, 0.55 gm. $MgSO_4 \cdot 7H_2O/1$, 0.55 gm. KCl/1, 0.011 gm. Rochelle salts/1, 0.011 gm. $FeSO_4 \cdot 7H_2O/1$, 0.0011 gm. $ZnSO_4 \cdot 7H_2O/1$, and preferably but not essentially a defoamer. The culture was incubated for 72 hours at 26° C. with continuous aeration and agitation. This fermentation was monitored for pH change, dextrose utilization, and mycelium production. One hundred gallons of this fermentation broth was filtered and the residual mycellium cake (36 pounds) was recovered.

(b) This cake was combined with a slightly alkaline phosphate buffer, i.e. between pH 7.5 and 9.0. For example the mycelium cake was suspended in pH 8.0 phosphate buffer (33 gallons) and stirred vigorously at room temperature for one hour. The buffer mixture was prepared as follows:

20 liters pH 8.0 phosphate buffer $Na_2HPO_4$: 92.58 g.; $NaH_2PO_4$: 5.52 g. (dilute to 20 liters).

The mycelium cake suspension was filtered and the clear filtrate or extract was retained (31 gallons).

(c) To the clear filtrate is added about an equal amount of a water-miscible organic solvent known to cause the precipitation of proteins such as acetone, methanol and ethanol. In the example, there was added slowly to the mycelium extract with stirring 28 gallons of acetone. The mixture was allowed to stand overnight at room temperature to allow the precipitation of the solids which formed and the soluble portion was carefully decanted away from the insoluble fraction.

(d) The precipitate was then centrifuged at 6500 r.p.m. for 30 minutes, the supernatant liquid then being discarded.

(e) The precipitate was then combined with enough water to assure extraction of the nucleic acid complex. In the example, 2.5 liters of water was used. The water extract was then centrifuged clear, and the insoluble portion discarded.

(f) The clear aqueous extract was then dialyzed in 30/32 dialysis casing agent 10 gallons of distilled water for 24 hours at 4° C., to assure removal of dialyzable materials. It may be dialyzed an additional 24 hours with a change of water.

(g) The non-dialyzable fraction (retenuate) was centrifuged at 6500 r.p.m. and the clear soluble portion was concentrated 25-fold by centrifugation 18 hours at 35,000 ×G to obtain a pellet, which is recovered.

(h) The 25-fold concentrate is suspended in a neutral, dilute sodium phosphate buffer, such as a 0.01 M sodium phosphate at pH 7.

(i) This is clarified by centrifuging for 10 minutes at 2000 r.p.m., the supernatant being recovered.

(j) A phenol extraction using 88% liquified phenol was then carried out at 35–40° C. for 30 minutes, using about an equal volume of the phenol. The phenol treatment is believed to break up the complex in which the nucleic acid of the invention is bound.

(k) The mixture was centrifuged 30 minutes at 5° to separate the aqeuous from the phenol layer and the phenol was discarded.

(l and m) The phenol extraction and centrifugation was carried out twice more at room temperature for 30 minutes each.

(n) The aqueous layer was dialyzed against a large volume (50–100 volumes) of 0.01 M sodium phosphate at pH 7 buffer to remove residual phenol.

(o) Further purification was obtained by chromatography on ecteolacellulose [the synthesis of this material was described by Peterson et al. in 78 JACS, 751–756, (1956)] which removed a large amount of inactive polysaccharide remaining after the phenol extraction.

A column 1.5 x 10 cm. of ecteolacellulose was prepared by suspending the ion-exchange material, successively in 0.5 N NaOH, distilled water, 0.5 M $NaH_2PO_4$, and then in 0.01 M sodium phosphate having a pH 7. This last slurry was poured into a glass column and washed through with about 200 ml. of 0.01 M sodium phosphate, pH 7, buffer. About 100–120 ml. of the dialyzed, phenol extracted 25-fold concentrate was applied to the column.

(p) The column was eluted with a stepwise NaCl gradient from 0.1 M to 0.5 M in 0.05 steps as this removed the impurities.

(q) It was then eluted stepwise from 0.5 M to 0.8 M in 0.1 M steps, each step being 20 ml. The NaCl gradient was collected in 20 ml. fractions in both cases. The interferon inducing activity peak was contained in the fractions following both the 0.5 and 0.6 M NaCl additions.

Rechromatography. The peak fractions of activity eluted from the 0.5 and 0.6 M NaCl steps were pooled and dialyzed against 0.01 M sodium phosphate, pH 7. Of this once chromatographed material, 100 ml. was applied to a column of ecteolacellulose 1.5 x 6 cm. Chromatography was performed under conditions identical to the first chromatography. The interferon inducing activity was again eluted in the 0.5 M and 0.6 M NaCl additions. All but a trace amount of inactive polysaccharide was eliminated during the second chromatography.

The following flow diagram illustrates the steps which have been described above for the isolation of the nucleic acid of the invention:

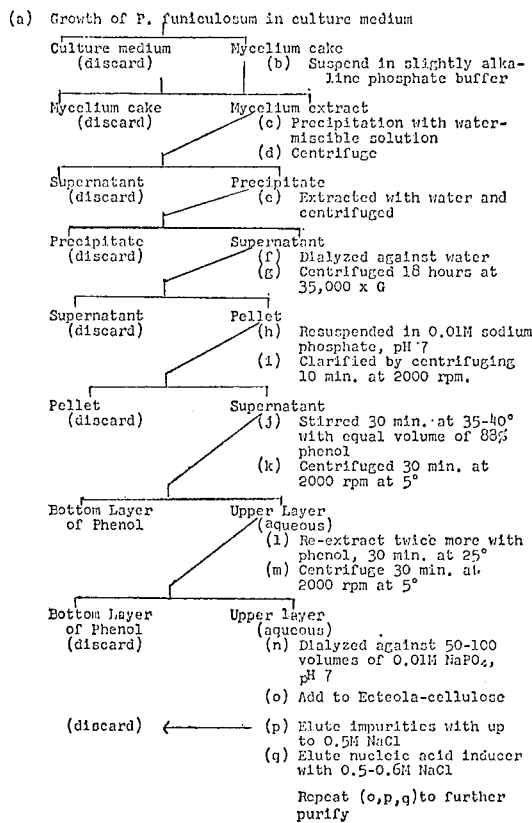

PRESENCE OF AN INHIBITOR OF THE INTERFERON INDUCER IN CRUDE EXTRACTS

The importance of the phenol addition step in releasing or otherwise making available the RNA of the invention is shown by the following: The increase in the inducing capacity of crude extracts which had been concentrated by centrifugation, on dilution or following phenol extraction strongly suggests the presence of a protein inhibitor which partially or completely masks the presence of the interferon inducer in various batches. The following data demonstrate this:

ACTIVATION OF INTERFERON INDUCER BY PHENOL EXTRACTION

| Inducer | Dilution | Average interferon titer * |
|---|---|---|
| Concentrated *P. funiculosum* extract | 1:2 | 5 |
| Do | 1:4 | 40 |
| Do | 1:8 | 40 |
| Do | 1:16 | 5 |
| Concentrated *P. funiculosum* extract after phenol treatment | 1:2 | 640 |
| Do | 1:4 | >640 |
| Do | 1:8 | 160 |
| Do | 1:16 | 40 |
| Normal | | 5 |

* Interferon induced in rabbits as explained in Example 1.

PROPERTIES OF THE NUCLEIC ACID

The purified inducer of interferon was characterized as a ribonucleic acid (RNA) by the following criteria: (1) ultraviolet spectrum typical of a nucleic acid, e.g. maxima at 257.5 and minima at 230 millimicrons, max./min., and 260/280 ratios greater than 2, (2) a reduction in interferon inducing activity following prolonged incubation at 37° C. to 56° C. temperatures with ribonuclease, (3) resistance to deoxyribonuclease and sodium periodate, (4) presence, shown by chemical analysis, of constituents normally found in RNA, (5) other chemical analyses, (6) relative resistance during short heating time in presence of ribonuclease, (7) relatively few free amino groups, (8)

high level thermal stability, i.e. Tm, (9) unique sedimentation coefficients and (10) double stranded helix formation. These are illustrated as follows:

(1) Ultraviolet adsorption spectrum

The ultraviolet adsorption spectrum is determined in a Beckman DU or DB–G spectrophotometer and is similar to known nucleic acids from various sources. The ultraviolet spectrum is illustrated in the accompanying drawing.

(2) Demonstration of ribonuclease sensitivity of the interferon inducer

The purified interferon inducing agent isolated from *P. funiculosum* was incubated for two hours at 37° and also 56°. At each temperature an additional sample contained added pancreatic ribonuclease (chromatographically pure). The incubated ribonuclease treated and untreated samples were tested for induction of interferon in rabbits; the results are presented in Table A.

TABLE A

Demonstration of ribonuclease sensitivity of the interferon inducer

| Treatment | Temp. of incubation, deg. | Interferon titer |
| --- | --- | --- |
| None | 37 | 320–640 |
| Ribonuclease | 37 | <5 |
| None | 56 | 640 |
| Ribonuclease | 56 | <5 |

(3) Demonstration of lack of deoxyribonuclease and periodate sensitivity

A solution of the purified interferon inducer was adjusted to pH 6 and a solution of 0.1 M sodium periodate was added to a final concentration of 0.01 M. After standing at room temperature for one hour the excess periodate was destroyed by the addition of 1% glycerol. This was followed by dialysis against phosphate buffered saline.

Another solution of the interferon inducer was incubated one hour at room temperature with electrophoretically purified deoxyribonuclease. The above treated solutions were tested for induction of interferon in rabbits; the results are presented in Table B.

TABLE B

Demonstration of lack of periodate and deoxyribonuclease sensitivity of the inducer

| Treatment: | Interferon titer |
| --- | --- |
| None | 40–320 |
| Periodate | 40–640 |
| None | 80–160 |
| Deoxyribonuclease | 80–160 |

(4) Determination of chemical analysis of the base composition of the interferon inducer The base (purine and pyrimidine) composition was determined by hydrolyzing a dried sample of the interferon inducer with 12 N perchloric acid for two hours at 100°. The acid hydrolysate was chromatographed on Whatman number 1 filter paper along with the four bases (adenine, guanine, cytosine, and uracil) normally found in ribonucleic acids. The bases are located as spots on the paper by means of ultra violet light, cut out and eluted with 0.1 N hydrochloric acid. From the Rf values (distance of base from original divided by distance traveled by the solvent) the identity of the ultraviolet light adsorbing spots on the filter paper are determined. From the absorption spectrum of the eluted spots identification of the bases found in the interferon inducer acid hydrolysate are determined; the results are presented in Table C.

TABLE C

Base composition of the interferon inducer

| Base identified | Rf | Rf (lit. ref.) |
| --- | --- | --- |
| Adenine | 0.24 | 0.25 |
| Guanine | 0.34 | 0.36 |
| Cytosine | 0.46 | 0.47 |
| Uracil | 0.66 | 0.68 |

Solvent system used in paper chromatography of the purine and pyrimidine bases was isopropanol-HCl-water. Lit. Ref.-Find, K., and Adams, W., J. of Chromatography 22 (1966), p. 118.

(5) Demonstration by other chemical analyses

TABLE D

Other chemical analyses of interferon inducer

| Chemical component | Percent | |
| --- | --- | --- |
| | Found | Theory |
| Ribose | 38.0 | 36.5 |
| Phosphorus | 8.4 | 8.6 |
| Protein | <1 | |
| Polysaccharide | <1 | |
| Deoxyribose | None | |

Sedimentation analyses. The sedimentation coefficient $(S_{20}, W)$ was determined and found to have an average value of 12.1.

(6) Demonstration of relative resistance to ribonuclease

The purified interferon inducer of this invention (HeI-RNA) is characterized by its high resistance to the enymatic degradation of pancreatic ribonuclease (RNase as compared to the low resistance of yeast RNA under the same conditions. This can be compared by separately treating them with RNase at PH 7.0 and measuring the resulting degradation of the RNA as indicated by the increase in optical density at 260 m$\mu$ with a Beckman DB–G recording spectrophotometer equipped with a controlled heater compartment. The HeI–RNA was present at 20 $\mu$g./ml. and it was heated at 25° C. with 0.2 $\mu$g./ml. of pancreatic RNase and over a period of 30 minutes there was less than a 1% increase in optical density. The yeast RNA when treated under the same conditions underwent a 16% increase in optical density. To test their relative resistances when heated to 56° C. in the presence of 10 $\mu$g./ml. of pancreatic RNase the yeast RNA had about a 12% increase in optical density in a few minutes whereas there was less than a 1% increase in optical density of the HeI–RNA in that same time.

(7) Demonstration of relatively fewer free amino groups

HeI–RNA and yeast ribosomal RNA were incluated at 35° C. for four hours in the presence or absence of 1.5% formaldehyde. There was only about a 0.25% increase in the UV spectrum in the 230–280 m$\mu$ range of HeI–RNA under such treatment. By contrast, there was about a 0.1 average increase in optical density of yeast RNA with the greatest shift in the absorbancy in the longer wavelengths. These data were interpreted to show relatively free amino groups in the HeI–RNA than in the yeast RNA, and to indicate a highly ordered secondary structure such as a double-stranded helix.

(8) Demonstration of high level of thermalstability

Thermal denaturation (Tm) of HeI–RNA was measured in experiments performed using a Beckman DB–G spectrophotometer equipped with a Tm analyzer and recorder to show the percent increase in optical density at 260 m$\mu$ over a period of increasing temperature. The Tm of yeast RNA was measured under the same condition. The two RNA's were put in SSC which is 0.16 M NaCl, 0.015 M sodium citrate having a pH 7.0 and an ionic strength of 0.2. A 0.1 SSC preparation, diluted with water, had an ionic strength of 0.02. The data obtained are in Table E.

TABLE E

Percent increase in optical density (OD) at 260 mμ.

| Temperature, °C. | Percent | | |
|---|---|---|---|
| | Yeast RNA in SSC | HeI-RNA in SSC | He-RNA in 0.1 SSC |
| 30 | 0 | 0 | — |
| 50 | 5 | 0 | 0 |
| 70 | 15 | 2 | 2 |
| 90 | 20 | 5 | 15 |

The increase in absorbancy of the double-stranded HeI–RNA at 260 mμ shown in Table E was a function of temperature at two different salt concentrations. In SSC there was only small increase in absorbancy even at 100° C., indicating that the Tm (thermal transition midpoint) was higher than this figure. At the lower ionic strength (0.1 SSC), hyperchromicity of 32 percent occurred principally in the range of from 85 to 100° C. with a Tm of 95° C. Single-stranded RNA from yeast ribosomes showed lesser hyperchromicity (20%) and this was over a broad temperature range between 40 and 75° C. (Tm 55° C.) in SSC. These findings showed that HeI–RNA has a high level of thermal stability.

In another test the HeI–RNA was treated with formaldehyde in a concentration of 2.76 percent. The results, under the conditions of Table E are set forth in Table F.

TABLE F

Percent increase in optical density (OD) at 260 mμ.

| Temperature: | HeI–RNA in SSC percent |
|---|---|
| 50° C. | 0 |
| 70° C. | 4 |
| 95° C. | 44 |

Table F shows that formaldehyde in a concentration of 2.76 percent effected a 44 percent increase in absorbancy of HeI–RNA in SSC on heating to 95° C. Haselkorn and Doty, J. Biol. Chem. 236, 2738 (1961), have demonstrated that formaldehyde reduces the Tm of hydrogen-bonded helical polynucleotides.

(9) Sedimentation coefficients

The sedimentation coefficients for three preparations of HeI–RNA at a concentration of 70 μg./ml. were determined in a Spinco model E analytical centrifuge. The $S_{20,w}$ values were 10.8, 12.6, and 12.9 with an average of 12.1. The molecular weight of HeI–RNA may be calculated to be about $1.6 \times 10^6$ if the relationship $S_{20,w} = 0.0882 M^{0.346}$ suggested by Studier, F. M., J. Mol. Biol., 11, 373 (1965), for native DNA is true also for double-stranded RNA.

(10) Double stranded helix formation

Evidence of this is set forth above.

The following examples illustrate the use of the RNA of this invention as an inducer of interferon production.

EXAMPLE 1

Induction of interferon in rabbits

The purified RNA fraction from *P. funiculosum* is administered as 0.5 ml. aliquots to 4.5 to 5.0 pound rabbits by intravenous injection. After about 2 hours, blood samples are taken from each rabbit by cardiac puncture. Serum is separated from each of the clotted blood samples and separately sterilized by exposure to ultraviolet irradiation. Aliquots of these sterilized samples are employed in the following tests.

Determination of interferon titers

The sterilized rabbit serum from each rabbit host is titrated separately by serial two-fold dilutions from 1:5–1:640 using cell culture growth medium as diluent. A one ml. sample of each dilution is added to each of four tube cultures of rabbit kidney cells which have been drained of spent growth medium. After overnight incubation at 35° C. the tube cultures are again drained and infected with 10 to 100 $TCID_{50}$ (Tissue culture infectious dose)$_{50}$ of virus contained in 1 ml. of growth medium. Each tube culture is incubated at 35° C. for an additional 3 days, then observed for evidence of viral cytopathic effects and scored (+) for positive evidence of such effects or (0) for lack of evidence of cytopathic effects. The interferon titer for each serum sample is determined as the reciprocal of the serum dilution of which 50% of the tubes show no cytopathic effects. Serum from untreated animals (i.e., normal control animals) is titrated in each experiment to evaluate normal serum factors. The titers thus determined are shown in Table 1.

TABLE 1

Interferon titers as determined in rabbit kidney tube cell cultures

| Dose per animal: | Interferon Titer of Serum |
|---|---|
| 8 μg. | 80–>640 |
| 2 μg. | 80–160 |
| 0.125 μg. | 5–10 |
| none | <5 |

CHARACTERIZATION OF INTERFERON

The interferon so produced in vivo can be isolated and be characterized by known methods. This isolated, induced interferon can be subjected to in vitro determination of its antiviral inhibiting properties and be characterized by (a) host specificity, (b) trypsin sensitivity, (c) molecular weight determination, and (d) isoelectric point; these named properties are explained in the following:

(a) Demonstration of species specificity of the induced interferon

Samples (3 ml.) of 2-fold serial dilutions in culture medium of the interferon samples from the above example are sterilized by exposure to ultraviolet irradiation and added to monolayers of various types of cells grown separately in 30 ml. tissue culture flasks. After overnight incubation, the serum samples are trained off and replaced by 0.5 ml. of vesicular stomatitis virus suspension and the cultures reincubated at 35° C. for an additional 1.5 hours. An overlay of 5 ml. of maintenance culture medium containing methylcellulose as a solidifying agent is added to each flask and incubation continued for an additional 3–4 days at 35° C. to allow virus plaque formation. The overlay medium then is removed and the cells stained with carbol fuchsin. Plaque numbers on interferon treated monolayers are compared to those in untreated virus infected control monolayers. The reciprocal dilution of interferon giving at least a 50% reduction in plaque number is considered the interferon titer of that sample. The titers thus determined illustrate species specificity, that is, interferon induced in an animal of a given species is active only in cells derived from an animal of that species. These titers are shown in Table E.

TABLE E.—SPECIES SPECIFICITY OF INDUCED INTERFERON IN TESTS WITH VESICULAR STOMATITUS VIRUS CHALLENGE

[Interferon titer assayed on cell culture]

| Exp. No. | Source of serum | Chick embryo | Mouse embryo | Rabbit kidney |
|---|---|---|---|---|
| 1 | Rabbit | | <20 | 160 |
| 2 | do | <6 | <12 | 96 |

(b) Demonstration of trypsin sensitivity of induced interferon

Interferon-containing serum from animals induced with purified RNA fraction from *P. funiculosum* is isolated by chromatography on CM-Sephadex (a cation-exchange material obtained by the introduction of carboxymethyl groups into Sephadex). A sample of the isolated interferon is treated with crystalline trypsin solution (50 μg./ml. final concentration) for 4 hours at 35° C. A similar untreated interferon sample is also incubated for 4 hours at 35° C. After the 4 hour incubation period, soybean trypsin inhibitor is added to each sample, including the control. The samples are titrated for interferon activity by the plaque reduction method. Trypsin solution to which soybean trypsin inhibitor has been added is also titrated for antiviral activity. The results of the trypsin sensitivity test are given in Table F.

TABLE F

Trypsin sensitivity of induced interferon

| | Interferon titer |
|---|---|
| Interferon alone | 52 |
| Interferon plus trypsin | <20 |
| Trypsin control | <20 |

(c) Determination of molecular weight of induced interferon

The molecular weight of *P. funiculosum* RNA induced interferons is determined according to the following method. Columns of 2 x 35 cm. size are packed with hydrated Sephadex G-200 beads and slowly percolated for 2 to 3 days with 0.006 M sodium phosphate, 0.15 M NaCl, pH 7 buffer to achieve equilibration (Sephadex is a hydrophilic insoluble substance formed by cross-linking the polysaccharide dextran. The designation "G-200" refers to the degree of cross-linking and, therefore, the porosity of the hydrated gel). A one milliliter amount of the serum containing induced interferon prepared as described in the example is applied to the columns. The flow rate in the column is adjusted to 20–25 ml. per hour and fractions are collected in 3 ml. amounts. The fractions are assayed for interferon content by the plaque reduction method and the molecular weight of each sample is calculated according to the formula $M^{1/3}=146\ [1.480-V/Vo^{1/3}]$ in which M is the molecular weight, V is the void volume of the column. This method yields values within 10% of reported molecular weights when tested with purified proteins.

The results of the molecular weight determination are as follows:

TABLE G

Rabbit interferons: Molecular weights
*P. funiculosum* RNA induced -- 60,000 and 130,000

(d) Determination of isoelectric point of interferon

The serum samples containing induced interferon are dialyzed overnight against 0.1 M sodium phosphate buffer, pH 6.0, or simply diluted 1:3 with buffer. Twenty milliliters (20 ml.) of each sample is applied to a 1.5 x 10 cm. CM-Sephadex column equilibrated with the same buffer and the interferon is eluted by successive addition of 5 ml. amounts of 0.1 M sodium phosphate with increasing increment of 0.2 pH unit. The effluent is collected in 5 ml. fractions and the pH and interferon activity of each is measured. The pH of the fraction with peak activity is noted and the isoelectric point is calculated by adding a 0.4 pH unit. The isoelectric point thus determined for interferon induced in rabbit serum by the administration of *P. funiculosum* RNA is 6.9–7.1.

EXAMPLE 2

Induced resistance against Columbia SK virus infection of mice

Columbia SK infection of mice results in symptoms of ruffled fur, lethargy, and flaccid paralysis followed by death in 3–4 days post-injection for the majority of animals. For evaluation of the effectiveness of the purified RNA in inducing a protective amount of interferon, the following is the experimental procedure:

The test solution (0.5 ml.) of the purified RNA is administered intraperitoneally 18 hours pre-infection to each of 15 mice each weighing between 14–16 grams. Sufficient Columbia SK virus to kill 90% of mice by 5 days post-infection is injected subcutaneously in a 0.5 ml. aliquot and each mouse then is treated with 0.5 ml. of the test solution injected intraperitoneally 3 hours post infection. Animals similarly treated with *P. funiculosum* RNA but uninfected with virus are observed for evidence of toxicity produced by this chemical. No toxicity is observed in any of the treated but uninfected animals. The animals continue their normal eating habits, continue to grow, and in all outward characteristics appear normal.

Daily accounts are kept of the number of live animals and the number of dead animals on that day. Animals are observed for 10 days. The results are presented in Table 2.

TABLE 2.—INDUCED RESISTANCE AGAINST COLUMBIA SK VIRUS INFECTION OF MICE

| Chemical agent | Total dose per animal, μg. | Survival, percent | Mean survival, day |
|---|---|---|---|
| *P. funiculosum* RNA | [1] 50 | 73.3 | 12.0 |
| Phosphate buffer | | 0.0 | 3.1 |

[1] Sample contained 50 μg. RNA/ml. 0.5 ml. was administered 18 hours prior to virus challenge and 0.5 ml. was administered 3 hours after virus challenge.

EXAMPLE 3

Induced resistance against pneumonia virus (PVM) infection of mice

Pneumonia virus of mice (PVM) infection of mice by intranasal inoculation results in a respiratory virus infection culminating in pneumonia with death occurring 6–7 days post-infection for the majority of animals. Solutions of the purified RNA are tested for ability to protect against PVM infection by pretreating twenty 8–10 gram mice intranasally with 0.03 ml. of the solution containing test material in Table 3, 4 hours before intranasal inoculation with virus. Sufficient virus is used to kill 75% of the mouse population by 6–7 days post-inoculation. By completion of the experiment (14 days), 59 of the 60 infected but untreated mice had died of virus infection.

Daily records are kept of the number of live animals and the number of dead animals on that day. Animals are observed for 14 days. The results are presented in Table 3.

TABLE 3.—INDUCED RESISTANCE TO INFECTION OF MICE WITH PENUMONIA VIRUS OF MICE

| Chemical agent | Total dose per animal | Survival, percent | Mean survival, day |
|---|---|---|---|
| *P. funiculosum* RNA | 20 μg. in 0.03 ml. | 90.0 | >14 |
| Phosphate buffered saline | 0.03 | 0 | 7 |

As stated above, the nucleic acid extracted by the above procedure is new and has not been obtained previously. As it has the complex structure of nucleic acids there is no known way for producing it by chemical processes; its only known source is its isolation and purification from the mycelia of *P. funiculosum*. The above data concerning the properties of the nucleic acid demonstrate that it is a highly purified double-stranded RNA. Thus, among other indications, double-strandedness of HeI-RNA was established based on high thermal transition temperature (>100° C.), reduction in thermal transition temperature by low ionic strength and by formaldehyde and resistance to RNase at room temperature under conditions where ribosomal RNA is rapidly degraded.

What is claimed is:

1. The method of preparing a nucleic acid which is an inducer of interferon production which comprises (a) growing *Penicillium funiculosum* in a culture media and separating and recovering the mycelium cake, (b) suspending the mycelium cake in sodium phosphate buffer and separating and retaining the buffer extract, (c) adding a water-miscible solvent to the extract and separating and recovering the precipitate which is thereby formed, (d) centrifuging to recover the precipitate, (e) adding water to the precipitate and separating and recovering the water extract, (f) dialyzing the water extract against distilled water, (g) centrifuging the resulting water extract to deposit a solid and recovering the solid, (h) adding sodium phosphate to suspend the solid, (i) centrifuging to obtain and recovering a clear supernatant, (j) adding phenol to the supernatant, (k) centrifuging to obtain and recovering a water layer (l and m) repeating these phenol addition and centrifuging steps and recovering the water layer, (n) dialyzing the water layer against sodium phosphate, (o) adding the dialyzed water layer to Ecteolacellulose, (p) removing impurities by elution with a NaCl molar concentration up to 0.5, (q) and recovering the fractions which are removed therefrom with an 0.5 to 0.6 molar NaCl addition, these latter fractions containing the nucleic acid inducer.

2. The method according to claim 1 in which step (b) is with a pH 8.0 sodium phosphate buffer.

3. The method according to claim 1 in which step (c) involves adding an equal volume of acetone.

4. The method according to claim 1 in which step (e) involves extracting with a minimal volume of water.

5. The method according to claim 1 in which step (h) involves a 0.01 M sodium phosphate at pH 7.

6. The method according to claim 1 in which step (i) involves an equal volume of 88% phenol at 35–40° C.

7. The method according to claim 1 in which step (n) involves 50–100 volumes of 0.01 M $NaPO_4$ pH 7.

8. The method according to claim 1 in which steps (o), (p) and (q) are repeated.

9. The nucleic acid obtained by carrying out the process of claim 1.

References Cited

Lewis et al., J. Am. Chem. Soc., vol. 82, pp. 5178–5182 (1960).

Shope, J. Exptl. Med., vol. 123, pp. 213–227 (1966).

ALVIN E. TANENHOLTZ, Primary Examiner

U.S. Cl. X.R.

195—28; 424—85